United States Patent
Wang et al.

(10) Patent No.: US 10,690,791 B2
(45) Date of Patent: Jun. 23, 2020

(54) METHOD, SYSTEM AND NON-TRANSITORY COMPUTER-READABLE MEDIUM FOR FORMING A SEISMIC IMAGE OF A GEOLOGICAL STRUCTURE

(71) Applicants: Statoil Gulf Services LLC, Houston, TX (US); Statoil (Beijing) Business Consulting Service Co., Ltd., Beijing (CN)

(72) Inventors: Meixia Wang, Beijing (CN); Sheng Xu, Katy, TX (US)

(73) Assignees: STATOIL GULF SERVICES LLC, Houston, TX (US); STATOIL (BEIJING) BUSINESS CONSULTING SERVICE CO., LTD., Beijing (CN)

( * ) Notice: Subject to any disclaimer, the term of this patent is extended or adjusted under 35 U.S.C. 154(b) by 432 days.

(21) Appl. No.: 15/543,458

(22) PCT Filed: Apr. 28, 2015

(86) PCT No.: PCT/EP2015/059139
§ 371 (c)(1),
(2) Date: Jul. 13, 2017

(87) PCT Pub. No.: WO2016/112997
PCT Pub. Date: Jul. 21, 2016

(65) Prior Publication Data
US 2018/0011210 A1    Jan. 11, 2018

(30) Foreign Application Priority Data
Jan. 14, 2015   (WO) ................ PCT/CN2015/070655

(51) Int. Cl.
*G01V 1/28*    (2006.01)

(52) U.S. Cl.
CPC ............ *G01V 1/28* (2013.01); *G01V 2210/43* (2013.01); *G01V 2210/57* (2013.01); *G01V 2210/582* (2013.01); *G01V 2210/673* (2013.01)

(58) Field of Classification Search
CPC .............. G01V 1/28; G01V 2210/673; G01V 2210/43; G01V 2210/57; G01V 2210/582
See application file for complete search history.

(56) References Cited

U.S. PATENT DOCUMENTS

| 2003/0055567 A1* | 3/2003 | Kelly ........................ G01V 1/28 702/14 |
| 2004/0117123 A1* | 6/2004 | Jing ......................... G01V 1/28 702/16 |

(Continued)

FOREIGN PATENT DOCUMENTS

| CN | 101840001 A | 9/2010 |
| CN | 103149585 A | 6/2013 |
| CN | 103713319 A | 4/2014 |

OTHER PUBLICATIONS

International Search Report for PCT/EP2015/059139 (PCT/ISA/210) dated Jan. 21, 2016.

(Continued)

*Primary Examiner* — Stephanie E Bloss
(74) *Attorney, Agent, or Firm* — Birch, Stewart, Kolasch & Birch, LLP (57) ABSTRACT

A method, system and non-transitory computer-readable medium for forming a seismic image of a geological structure are provided. After obtaining seismic wave data including a plurality of seismic wave traces at a first region of the geological structure, a predicted time dispersion error of an actual time dispersion error that results from a use of a finite difference approximation in calculating predicted seismic wave data at a second region of the geological structure as if a seismic wave propagates from the first region to the (Continued)

second region of the geological structure, is calculated. A corrected predicted seismic wave data at the second region of the geological structure is calculated by applying the finite difference approximation to the seismic wave data at the first region of the geological structure compensated with the predicted time dispersion error. A seismic image of the second region of the geological structure is generated using the corrected predicted seismic wave data, such that the actual time dispersion error is negated by the predicted time dispersion error.

24 Claims, 7 Drawing Sheets

(56) References Cited

U.S. PATENT DOCUMENTS

| | | | | |
|---|---|---|---|---|
| 2004/0196738 A1* | 10/2004 | Tal-Ezer | ............... | G01V 1/28 367/51 |
| 2007/0225937 A1* | 9/2007 | Spiesberger | ............ | G01S 5/02 702/150 |
| 2009/0248312 A1* | 10/2009 | Hsu | .................... | G01V 1/28 702/15 |
| 2010/0088035 A1* | 4/2010 | Etgen | .................... | G01V 1/30 702/16 |
| 2011/0255371 A1* | 10/2011 | Jing | ..................... | G01V 1/28 367/73 |
| 2012/0113750 A1* | 5/2012 | Al-Momin | ............ | G01V 1/364 367/38 |
| 2012/0243371 A1* | 9/2012 | Zhang | ................... | G01V 1/282 367/43 |
| 2017/0235002 A1* | 8/2017 | Kamil Amin | .......... | G01V 1/325 702/17 |

OTHER PUBLICATIONS

Liu et al., "A new time-space domain high-order finite-difference method for the acoustic wave equation", Journal of Computational Physics, vol. 228, No. 23, 2009, pp. 8779-8806.

Written Opinion of the International Searching Authority for PCT/EP2015/059139 (PCT/ISA/237) dated Jan. 21, 2016.

Zhao et al., "Stability and Numerical Dispersion Analysis of Finite-Difference Method for the Diffusive-Viscous Wave Equation", International Journal of Numerical Analysis and Modeling, Series B. vol. 5, No. 1-2, pp. 66-78.

Chinese Office Action and Search Report, dated Sep. 20, 2018, for Chinese Application No. 201580077150.5, with English translations.

Yu et al., "Identification of the Carbonate Reservoir Based on Spectral Decomposition," Progress in Geophys., vol. 28, No. 3, Jun. 2013, pp. 1440-1446, with English abstract.

* cited by examiner

METHOD, SYSTEM AND NON-TRANSITORY COMPUTER-READABLE MEDIUM FOR FORMING A SEISMIC IMAGE OF A GEOLOGICAL STRUCTURE

CROSS-REFERENCE TO RELATED APPLICATIONS

None

BACKGROUND OF THE INVENTION

1. Field of the Invention

The present invention relates to seismic data, and more particularly to a method, system and non-transitory computer-readable medium for forming a seismic image of a geological structure.

2. Background of the Invention

The research of seismic imaging on complex geological structures currently focuses on the development of algorithms that are based on two-way wave equations, such as reverse-time migration (RTM) and full-waveform inversion (FWI). However, the wave propagation has dominated the computational time/cost for seismic imaging on complex geological structures, and the accuracy and efficiency of wave propagation are crucial to the success of real applications of these algorithms. One commonly used method to calculate wave field is the finite difference (FD) method.

To improve the efficiency of wave propagation calculation, conventional ways tend to use large sampling rate of discretization. However, numerical dispersion due to discretization of time and space derivatives can introduce severe numerical errors in synthetic data and migrated images, especially when the sampling rate is large. Therefore, reduction of numerical dispersion has become important for efficient and accurate wave propagation algorithms.

FD dispersion in space could be ameliorated by long stencil method or spectral method. However, the time extrapolation calculated by one side extrapolation of time steps could not be easily implemented by spectral methods, introducing errors that are proportional to the time of propagation, and with phenomena that different frequency components of wavefields propagate with different velocities. For example, for the conventional $2^{nd}$ order FD time scheme, it appears that the high frequency components tend to propagate faster than expected. These time dispersion errors might distort the phase and introduce severe artifacts to the data and images, especially for long time propagation. For seismic imaging, the time dispersion might cause mispositioning of reflectors, especially for deep reflectors with high frequency and imaged from long offset data. Although the time dispersion errors may be improved by reducing the time steps used in the FD method, the computational cost dramatically increases.

SUMMARY OF THE INVENTION

Accordingly, it is an object of the present invention to provide a method, system and non-transitory computer-readable medium for forming a seismic image of a geological structure that can reduce and/or eliminate the FD time dispersion errors at marginal computational cost.

To achieve the above-mentioned object, according to a first aspect of the present invention, a method for forming a seismic image of a geological structure, the method comprises: obtaining seismic wave data at a first region of the geological structure, the seismic wave data including a plurality of seismic wave traces; calculating a predicted time dispersion error of an actual time dispersion error that results from a use of a finite difference approximation in calculating predicted seismic wave data at a second region of the geological structure as if a seismic wave propagates from the first region to the second region of the geological structure; compensating each of the seismic wave traces of the seismic wave data at the first region of the geological structure with the predicted time dispersion error, before using the finite difference method to calculate the predicted seismic wave data at the second region of the geological structure; calculating a corrected predicted seismic wave data at the second region of the geological structure by applying the finite difference approximation to the seismic wave data at the first region of the geological structure compensated with the predicted time dispersion error; and generating a seismic image of the second region of the geological structure using the corrected predicted seismic wave data, such that the actual time dispersion error is negated by the predicted time dispersion error.

According to a second aspect of the present invention, a system for forming a seismic image of a geological structure comprises: a plurality of seismic sensors configured to collect seismic wave data at a first region of the geological structure, the seismic wave data including a plurality of seismic wave traces; and a seismic imaging generating apparatus configured to: receive the seismic wave data at the first region of the geological structure collected by the plurality of seismic sensors, calculate a predicted time dispersion error of an actual time dispersion error that results from a use of a finite difference approximation in calculating predicted seismic wave data at a second region of the geological structure as if a seismic wave propagates from the first region to the second region of the geological structure, compensate each of the seismic wave traces of the seismic wave data at the first region of the geological structure with the predicted time dispersion error, before using the finite difference method to calculate the predicted seismic wave data at the second region of the geological structure; calculate a corrected predicted seismic wave data at the second region of the geological structure by applying the finite difference approximation to the seismic wave data at the first region of the geological structure compensated with the predicted time dispersion error, and generate a seismic image of the second region of the geological structure using the corrected predicted seismic wave data, such that the actual time dispersion error is negated by the predicted time dispersion error.

According to a second aspect of the present invention, a non-transitory computer-readable medium containing computer executable instructions for performing a method for forming a seismic image of a geological structure is provided. The computer executable instructions comprises: obtaining seismic wave data at a first region of the geological structure, the seismic wave data including a plurality of seismic wave traces; calculating a predicted time dispersion error of an actual time dispersion error that results from a use of a finite difference approximation in calculating predicted seismic wave data at a second region of the geological structure as if a seismic wave propagates from the first region to the second region of the geological structure; compensating each of the seismic wave traces of the seismic wave data at the first region of the geological structure with the predicted time dispersion error, before using the finite difference method to calculate the predicted seismic wave data at the second region of the geological structure; calculating a corrected predicted seismic wave data at the second region of the geological structure by applying the finite difference approximation to the seismic wave data at the first region of the geological structure compensated with the predicted time dispersion error; and generating a seismic image of the second region of the geological structure using the corrected predicted seismic wave data, such that the actual time dispersion error is negated by the predicted time dispersion error.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(a) shows a relative error $$\frac{|\theta(\omega, \Delta t) - \omega \Delta t|}{\omega \Delta t}$$

with respective to the frequency for the $2^{nd}$ order FD scheme;

FIG. 1(b) shows a relative error $$\frac{|\theta(\omega, \Delta t) - \omega \Delta t|}{\omega \Delta t}$$

with respective to the time step $\Delta t$ for the $2^{nd}$ order FD scheme;

DETAILED DESCRIPTION OF THE ILLUSTRATED EMBODIMENTS

The present invention will now be described in detail with reference to the accompanying drawings, wherein the same reference numerals will be used to identify the same or similar elements throughout the several views. It should be noted that the drawings should be viewed in the direction of orientation of the reference numerals.

The present invention is directed to reduction and/or elimination of the time dispersion errors such that more accurate seismic image of a geological structure can be formed without sacrificing computational efficiency or increasing computational cost.

In order to effectively reduce or eliminate the time dispersion errors, an investigation of the time dispersion problem is necessary. The investigation starts with a general wave equation. With absence of source term, the propagation can be described by Equation (1) as follows:

$$\frac{\partial^2 u}{\partial t^2} - Lu = 0, \tag{1}$$

where $u=u(\vec{x}, t)$ is the wavefield, which may represent pressure for an acoustic case or displacement vector for an elastic case, t is time, and L is a space differential operator.

In acoustic case, $Lu=v^2\Delta$, with $\Delta$ as the Laplacian operator $$\left(\Delta - \frac{\partial^2}{\partial x_1^2} + \frac{\partial^2}{\partial x_2^2} + \frac{\partial^2}{\partial x_3^2}\right)$$

and $v=v(\vec{x})$ as the velocity. In elastic case, $$Lu = \frac{1}{\mu} \cdot \frac{\partial}{\partial x_j}\left(C_{i,j,k,l} \frac{\partial u_k}{\partial x_l}\right),$$

with ρ as the density and $C_{ijkl}$ as the stiffness tensor.

The term Lu involves space derivative operator that is assumed to be accurately calculated by the Fourier method. With respect to the time dispersion and its corrections, based on Taylor expansion, a general time scheme can be obtained by the following Equation (2)

$$u(t+\Delta t) + u(t-\Delta t) - 2u(t) = 2F\left(\frac{\partial^2}{\partial t^2}, +\infty, \Delta t\right)u, \tag{2}$$

where $\Delta t$ is the time step, and the mapping F is defined as $$F(\chi, n, \Delta t) = \sum_{k=1}^{n} \frac{\Delta t^{2k}}{(2k)!} \chi^k. \quad (3)$$

In Equation (3), $\chi$ can be an operator as in Equation (2) or it can be a variable. Therefore, F is a functional of the operator or a function of the variable. In Equation (2), the time derivative terms on the right hand side are computed by space derivatives as follows $$u(t+\Delta t)+u(t-\Delta t)-2u(t)=2F(L,+\infty,\Delta t)u, \quad (4)$$

In practice, only a limited number of terms is used on the right hand side of Equation (4). For example, a 2n-order (n is a positive integer) FD scheme is as follows:

$$u(t+\Delta t)+u(t-\Delta t)-2u(t) \cong 2F(L,n,\Delta t)u, \quad (5)$$

It should be noted that the symbol "$\cong$" is used in Equation (5), because Equation (5) is just an approximation instead of the exact equality relation. If n=1, Equation (5) is the $2^{nd}$ order FD scheme. If n=2, Equation (5) is the $4^{th}$ order FD scheme.

As can been seen in Equation (5), The FD schemes for time and space discretization of wave equations can be treated separately, such as the FD in time is an integral for a given $2^{nd}$ order time derivative and the FD in space is a regular $1^{st}$ order or $2^{nd}$ order derivative. Therefore, time dispersion could be considered independently from space dispersion.

Forward Time Dispersion Transform (FTDT)

The time dispersion in Equation (5) (i.e., the left hand side of Equation (5)) can be predicted as follows. The time dispersion is analyzed and the predicted dispersion is compared with what is calculated by pseudo-spectral method to verify the accuracy of the predicted dispersion that is predicted in accordance with an embodiment of the present invention. In this illustrated example, a simple 1D model is used to demonstrate how the time dispersion is predicted.

To analyze the time dispersion, a time Fourier transform $\hat{u}(\omega)=\int u(t)e^{i\omega t}dt$ is applied to Equation (5). In theory, the Fourier transform of u(t+$\Delta t$) on the left hand side of Equation (5) is $e^{-i\omega\Delta t}\hat{u}(\omega)$ if there is no approximation error. However, because of time dispersion from FD approximation, the phase shift is not exactly $\omega\Delta t$. Since the phase shift is related to the frequency and time step, it is assumed to be $\theta(\omega, \Delta t)$. Then the corresponding transform of u(t+$\Delta t$) is $e^{-i\theta(\omega,\Delta t)}\hat{u}(\omega)$ is made. Similarly, the transform of u(t-$\Delta t$) is $e^{i\theta(\omega,\Delta t)}\hat{u}(\omega)$. Since the space derivatives on the right hand side of Equation (5) are calculated accurately with no numerical errors, the corresponding Fourier transform is not affected. Based on the above analysis, Equation (5) becomes as follows:

$$e^{-\theta(\omega,\Delta t)}\cdot\hat{u}(\omega)+e^{i\theta(\omega,\Delta t)}\cdot\hat{u}(\omega)-2\hat{u}(\omega)=2F(-\omega^2,n,\Delta t)\hat{u}(\omega), \quad (6)$$

which implies:

$$\cos(\theta(\omega,\Delta t))=1|F(\omega^2,n,\Delta t). \quad (7)$$

As a result, Equation (8) is obtained as follows:

$$\theta(\omega,\Delta t)=sgn\ (\omega)\cdot a\ \cos(1+F(-\omega^2,n,\Delta t)). \quad (8)$$

Figure 1A:
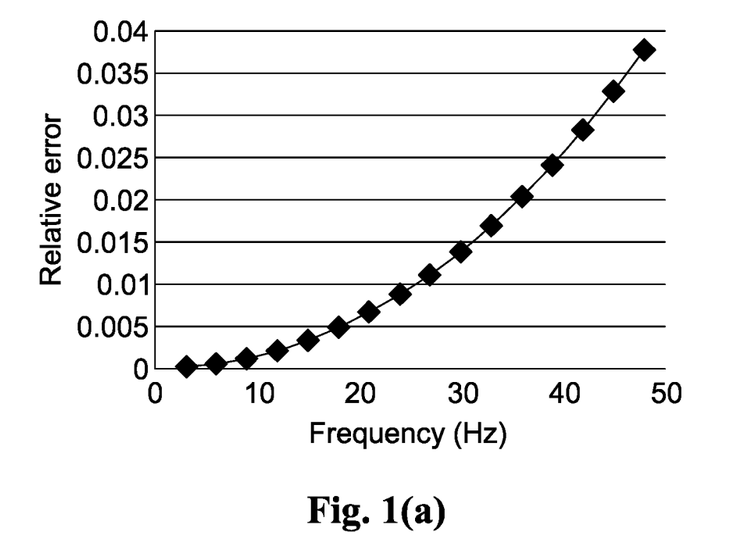
Figure 1B:
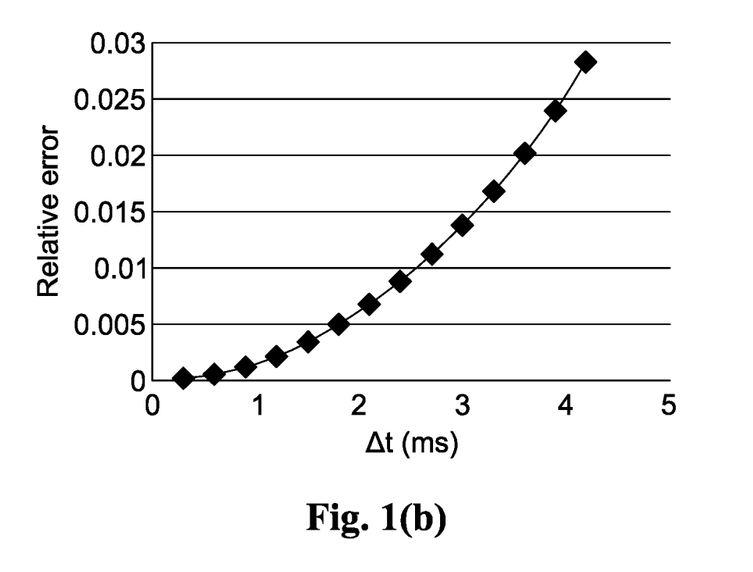

According to Equation (8), when the frequency is low and the time step $\Delta t$ is small enough, $\theta(\omega, \Delta t)$ is close to $\omega\Delta t$. Therefore, the time dispersion error is small when the frequency is low and the time step $\Delta t$ is small. However, the error $|\theta(\omega, \Delta t)-\omega\Delta t|$ increases with the time step and frequency. The relative error $$\frac{|\theta(\omega, \Delta t) - \omega\Delta t|}{\omega\Delta t}$$

for the $2^{nd}$ order FD scheme is shown in FIG. 1.

To predict the time dispersion from the FD schemes, a "Forward Time Dispersion Transform" (FTDT) is proposed here, which should be implemented for every single time trace u(t) which has no time dispersion errors, as described in the following steps:

(1) Calculate $\theta(\omega, \Delta t)$ by Equation (8) for valid frequencies;

(2) Apply Fourier Transform to the trace: $\hat{u}(\omega)=\int u(t)e^{i\omega t}dt$ to transform the trace into the frequency domain;

(3) Apply inverse "modified" Fourier transform to obtain the predicted trace in the time domain:

$$\bar{u}(t) = \frac{1}{2\pi}\int \hat{u}(\omega)e^{-i\frac{\theta(\omega,\Delta t)}{\Delta t}t}d\omega.$$

It should be noted that step (3) is a "modified" inverse Fourier transform, in which, instead of using $\omega\Delta t$ as in an inverse Fourier transform, it has been replaced with the phase shift $\theta(\omega, \Delta t)$. This results in the FTDT predicted trace $\hat{u}(t)$.

To verify the accuracy of the FTDT prediction, the $2^{nd}$ order and $4^{th}$ order FD schemes are used as examples. In the illustrated examples shown in FIGS. 2(a) and 2(b), a 1D model with a constant velocity 1500 m/s is used. The source is a Ricker wavelet with peak frequency 10 Hz. Distance between the source and the receiver is 18 km. The blue solid line is the trace calculated by the pseudo-spectral method, the red dashed line is the trace predicted by the FTDT method, the green solid line is the analytical solution, and the black dashed line is obtained by applying ITDT on the trace calculated by pseudo-spectral method (blue line).

Figure 2A:
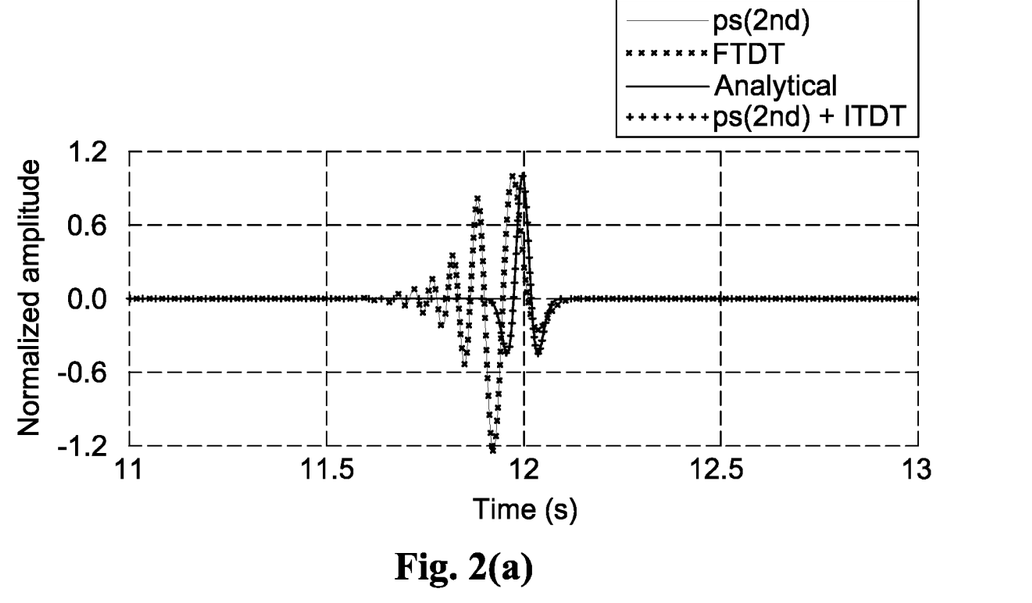
FIG. 2(a) shows a 1D modeling example in the $2^{nd}$ order FD scheme in accordance with an embodiment of the present invention.
Figure 2B:
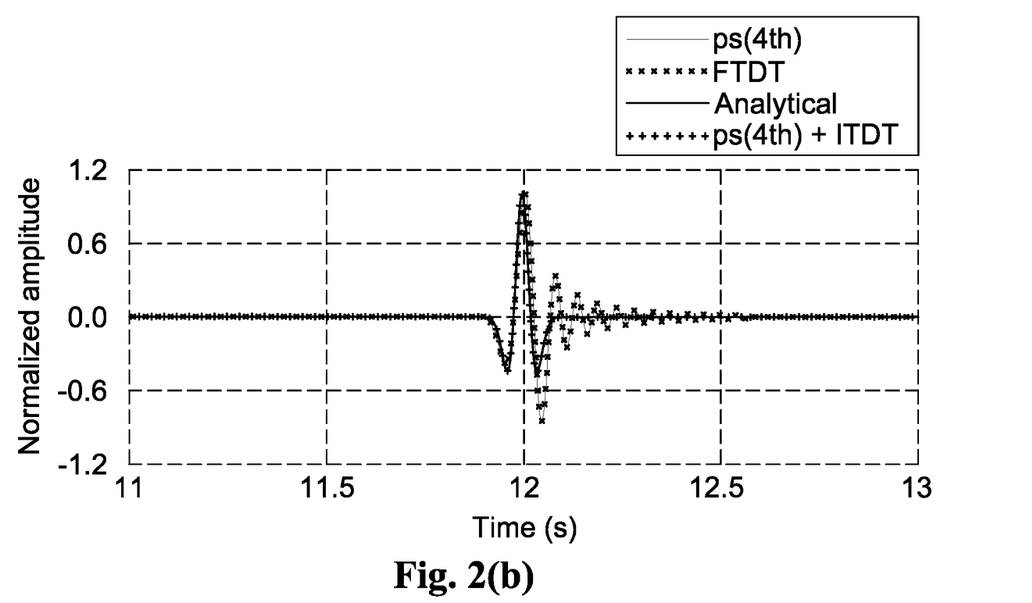
FIG. 2(b) shows a 1D modeling example in the $4^{th}$ order FD scheme in accordance with an embodiment of the present invention.

In order to verify the prediction capability of the FTDT method, the comparison between the FTDT predicted traces and those calculated by the pseudo-spectral method are illustrated. The FTDT predicted traces are obtained by applying the FTDT transform on the analytical traces (the green line in FIGS. 2(a) and 2(b)) which are accurate and have no numerical errors. The time steps are $\Delta t=3$ ms in the $2^{nd}$ order modeling and $\Delta t=9$ ms in the $4^{th}$ order modeling. In the illustrated examples, the perfect match between the blue solid line (the pseudo-spectral method) and the red dashed line (the FTDT method) in FIGS. 2(a) and 2(b) shows that the FTDT method accurately predicts the time dispersion for a long propagation time. It is also observed that the modeled wavelet shape is severely distorted because of time dispersion.

Inverse Time Dispersion Transform (ITDT)

In view of the above, it is clear that the time dispersion is predicted accurately by the proposed FTDT method. Since the time dispersion has been accurately predicted, a "modified" inverse Fourier transform can be used to compensate for the time dispersion. In order to eliminate the time dispersion, an "Inverse Time Dispersion Transform" (ITDT) is applied to every single modeled trace as follows:

(1) Calculate $\theta(\omega, \Delta t)$ by Equation (8) for valid frequencies;

(2) Apply a "modified" Fourier transform:

$$\hat{u}'(\omega) = \frac{1}{2\pi} \int u(t) e^{i\frac{\theta(\omega,\Delta t)}{\Delta t}t} dt$$

to transform the trace in the frequency domain with the phase shift θ(ω, Δt);

(3) Apply inverse Fourier transform: ū'(t)=∫û'(ω)e$^{-i\omega t}$dω to obtain the ITDT corrected trace ū'(τ) in the time domain.

It should be noted that step (2) is a "modified" Fourier transform, in which, instead of using ωΔt as in Fourier transform, it has been replaced with the phase shift θ(ω, Δt).

In particular, ITDT is the inverse procedure of FTDT, and it can remove time dispersion errors in the synthetic data. To verify its effectiveness, the ITDT correction is applied to the traces calculated by the pseudo-spectral method (the blue line in FIGS. 2(a) and 2(b)), and the result is compared with the analytical solutions (the green line in FIGS. 2(a) and 2(b)). The ITDT corrected traces are shown as the black dashed line in FIGS. 2(a) and 2(b). It can be observed that the phase distortion is removed after the ITDT correction is applied. The fact that the ITDT-corrected traces match perfectly with the analytical solutions for both the 2$^{nd}$ order and 4$^{th}$ order schemes shown in FIGS. 2(a) and 2(b) indicates that the ITDT method works well to remove the time dispersion errors in synthetic modeling.

Figure 3:
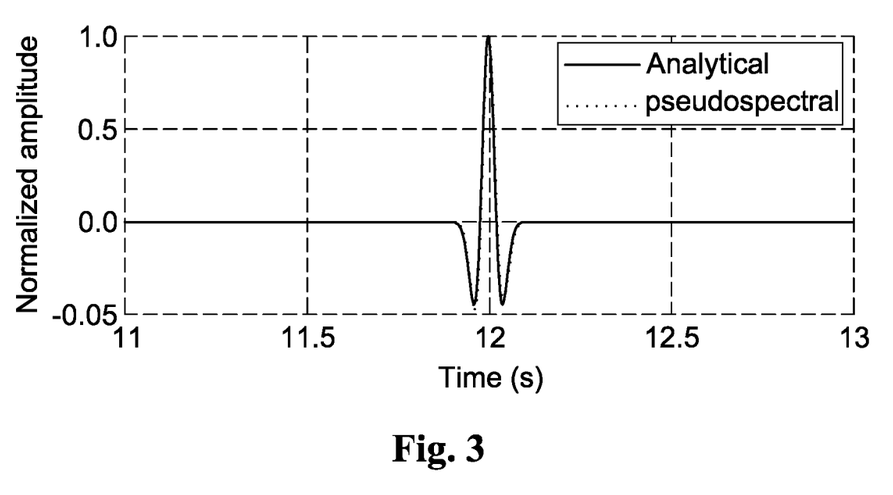
FIG. 3 shows a fine time step example calculated by the pseudo-spectral method in the $2^{nd}$ order scheme.

For comparison purposes, the time dispersion results using finer time steps are also shown in FIG. 3. In this example, the distance between the receiver and the source is 18 km, and the 2$^{nd}$ order scheme calculated by the pseudo-spectral method is illustrated, showing the modeled trace (black dashed line) using a time step Δt=0.5 ms and its comparison with the analytical solution (green solid line). Although using a very fine time step, with five times more computational cost than using a time step Δt=3 ms, some numerical errors still exist in the trace modeled by the pseudo-spectral method (the black dashed line in FIG. 3). On the other hand, when the ITDT method is used, larger time steps can be used and computational time is dramatically reduced, while the time dispersion errors are effectively removed, as shown in FIG. 2(a). This clearly shows the superiority of the ITDT correction method for synthetic modeling.

Similar to seismic modeling, the present invention can also be applied to seismic imaging. For example, the quality of RTM images is also affected by numerical errors from time dispersion. The phase can be distorted, resulting in the shifted depth. To eliminate the time dispersion errors in RTM imaging, the FTDT correction can be applied on the data before backward propagation. In an embodiment of the present invention, the workflow for RTM imaging can be as follows:

(1) Forward propagation to calculate forward seismic wave data at the second region of the geological structure;

(2) Apply FTDT on the seismic wave data before backward propagation to compensate each of the seismic wave traces of the seismic wave data at the first region of the geological structure with a predicted time dispersion error;

(3) Backward propagation to calculate a corrected predicted backward seismic wave data at the second region of the geological structure by applying the finite difference approximation to the seismic wave data at the first region of the geological structure compensated with the predicted time dispersion error; and (4) Apply imaging condition to generate a seismic image of the second region of the geological structure using the corrected predicted seismic wave data, such that the actual time dispersion error is negated by the predicted time dispersion error.

In particular, the FTDT correction on data before backward propagation compensates for the RTM image distortion introduced by forward modeling and backward modeling by phase shifting the seismic wave data at the first region of the geological structure with an amount corresponding to the predicted time dispersion error. In addition, the entire RTM workflow does not change the computational cost/time too much. The cost of FTDT is negligible compared to the computational time of RTM, thus guaranteeing the efficiency.

1D RTM Example

Figure 4A:
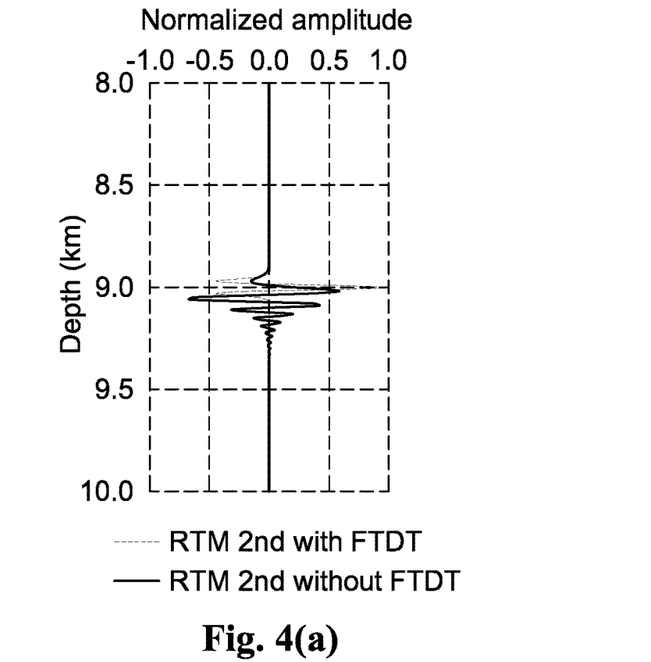
FIG. 4(a) shows a 1D RTM example with and without applying the FTDT correction on data in the $2^{nd}$ order FD scheme.
Figure 4B:
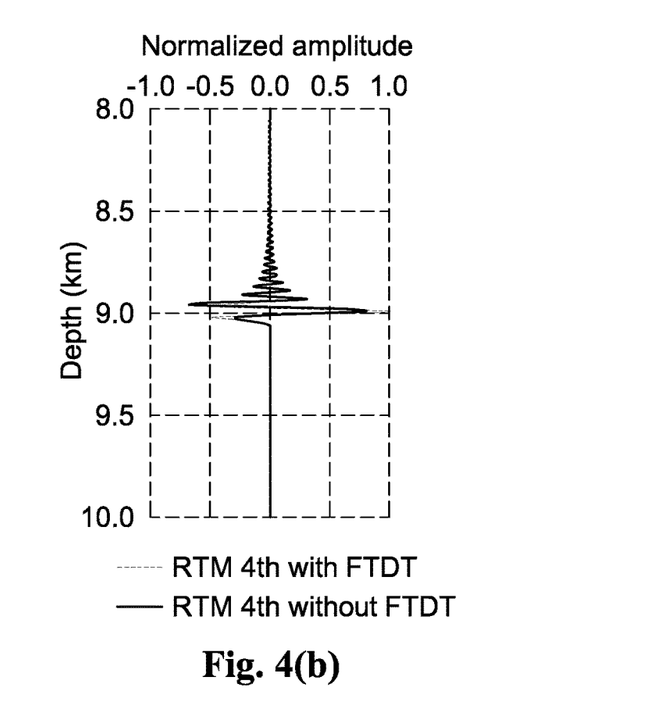
FIG. 4(b) shows a 1D RTM example with and without applying the FTDT correction on data in the $4^{th}$ order FD scheme.

To demonstrate the effectiveness of the present invention for RTM imaging, impulse response tests for both the 2$^{nd}$ order and 4$^{th}$ order FD schemes are illustrated in FIGS. 4(a) and 4(b). These tests are based on the same 1D model used in FIGS. 2(a) and 2(b). The input data is a Ricker wavelet with peak frequency 10 Hz and an impulse at 12 s. The RTM results for the 2$^{nd}$ order and 4$^{th}$ order FD schemes are shown in FIGS. 4(a) and (b), respectively. The time steps are Δt=3 ms for the 2$^{nd}$ order scheme and Δt=9 ms for the 4$^{th}$ order scheme. The comparisons between the RTM responses with and without the FTDT correction show that the severe phase distortion is removed and the depth becomes accurate by applying the FTDT correction method. Except for a little computational time spent on applying FTDT to the input data, this approach does not increase memory cost or any further computational cost. This allows the use of large time steps for imaging, which significantly improves efficiency.

3D TTI RTM Example

Figure 5:
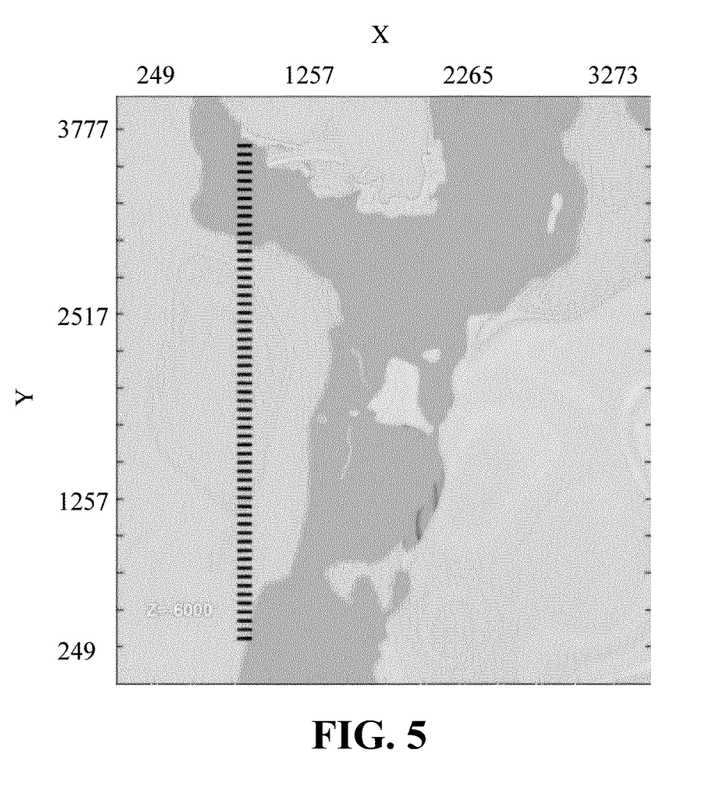
FIG. 5 shows shots used in a 3D SEAM TTI example.

In this example, the FTDT correction is applied on the 3D SEAM (SEG Advanced Modeling Corporation) TTI (tilted transverse isotropy) model. In particular, the 2$^{nd}$ order FD time scheme and the TTI equation proposed by Xu and Zhou (Xu, S., and H. Zhou, 2014, *Accurate simulations of pure quasi-P-waves in complex anisotropic media: Geophysics*, 79, no. 6, T341-T348) are used for forward and backward propagations. A total number of 342 shots shown in FIG. 5 are selected for RTM imaging, and the black lines show the selected 6 shot lines with the 342 shots.

Figure 6A:
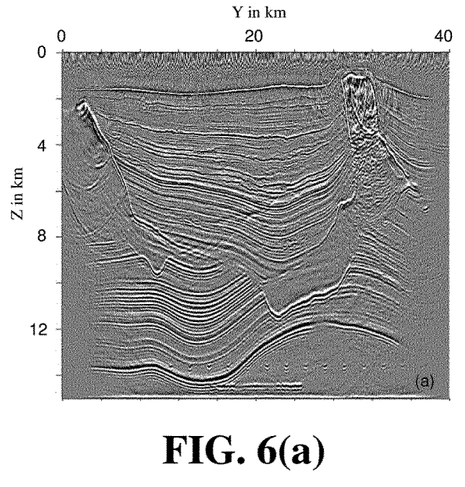
FIG. 6(a) shows an RTM image generated by the conventional RTM.
Figure 6B:
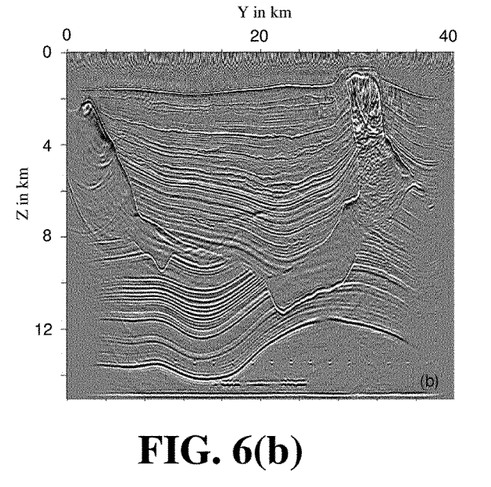
FIG. 6(b) shows an RTM image generated by applying the FTDT correction on data before back propagation in accordance with an embodiment of the present invention.
Figure 6C:
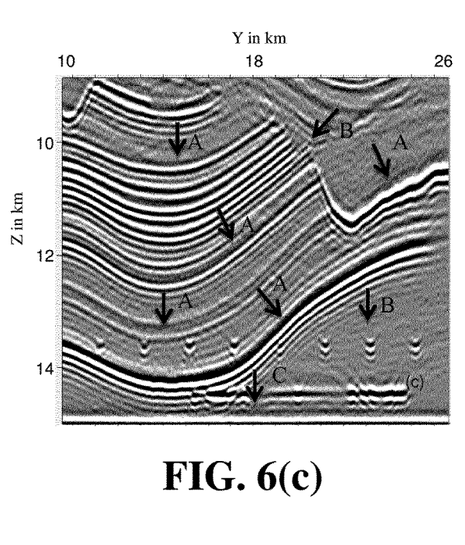
FIG. 6(c) shows an enlarged view of the deep part in FIG. 6(a)
Figure 6D:
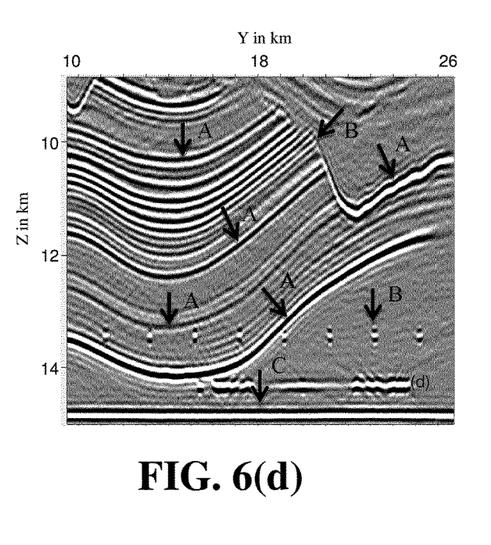
FIG. 6(d) shows an enlarged view of the deep part in FIG. 6(b).

The RTM image (at X=8360 m) generated by the conventional RTM is shown in FIG. 6(a), while the RTM image (at X=8360 m) generated by applying the FTDT correction on data before backward propagation is shown in FIG. 6(b). In addition, the same time step Δt=3.032 ms for wave propagation in both cases using 2$^{nd}$ order FD time scheme. The maximum frequency used for migration is 20 Hz. Comparing FIGS. 6(a) and (b), it can be observed that the events in FIG. 6(b) are much clearer and more focused by using the FTDT correction method. The depth of the events, especially for the deep events, is also corrected to the right position by applying the FTDT correction on data before backward propagation. FIGS. 6(c) and 6(d) respectively show the enlarged view of the deep part in FIGS. 6(a) and 6(b), which clearly show that the RTM image generated by applying the FTDT correction on data before backward propagation provides better image quality: 1) better wavelets have been achieved with much less ripple effects (arrows A); 2) the reflector depth has been corrected to the right position (arrow C); and 3) a better focused image has been obtained which is indicated by the improvement of focusing on the image of diffraction points and the unconformity reflector at sediments and base of salt (arrows B). These illustrated examples clearly indicate that the FTDT correction method works well in complex 3D imaging and in both isotropic media and anisotropic media.

In view of the above, it is clear that the time dispersion transform FTDT and its inverse transform ITDT, when properly chosen, can remove time dispersion in seismic modeling and imaging. The forward transform FTDT can almost perfectly predict the time dispersion in FD modeling, and can be applied to eliminate time dispersion artifacts in RTM images. The inverse transform ITDT can be used to remove time dispersion errors in synthetic modeling. These transforms remove time dispersion errors with a negligible cost increase. In addition, a relatively large time step is also allowed for wave propagation, which significantly increases efficiency while ensuring accuracy.

The illustrated examples show how the present invention can be applied in seismic modeling and imaging applications, and show the time dispersion can be respectably handled in both isotropic and anisotropic media. The present invention can also be used in least-squares RTM and FWI algorithms to improve efficiency and accuracy. This significantly enhances the seismic processing workflow, and generates high quality images of complex subsurface geological structures for oil and gas exploration and any other geological exploration.

In view of the above, the illustrated embodiments illustrate a method for forming a seismic image of a geological structure, comprising obtaining seismic wave data at a first region of the geological structure, the seismic wave data including a plurality of seismic wave traces; calculating a predicted time dispersion error of an actual time dispersion error that results from a use of a finite difference approximation in calculating predicted seismic wave data at a second region of the geological structure as if a seismic wave propagates from the first region to the second region of the geological structure; compensating each of the seismic wave traces of the seismic wave data at the first region of the geological structure with the predicted time dispersion error, before using the finite difference method to calculate the predicted seismic wave data at the second region of the geological structure; calculating a corrected predicted seismic wave data at the second region of the geological structure by applying the finite difference approximation to the seismic wave data at the first region of the geological structure compensated with the predicted time dispersion error; and generating a seismic image of the second region of the geological structure using the corrected predicted seismic wave data, such that the actual time dispersion error is negated by the predicted time dispersion error.

In an embodiment of the present invention, the step of calculating the predicted time dispersion error comprises: estimating a phase shift that results from the use of the finite difference approximation in calculating predicted seismic wave data at the second region of the geological structure, wherein the phase shift is $\theta(\omega, \Delta t) = \text{sgn}(\omega) \cdot a \cos(1 + F(-\omega^2, n, \Delta t))$, where $\omega$ is an angular frequency of the seismic wave trace,
$\Delta t$ is a time step of the finite difference approximation,
$2n$ is an order of the finite difference approximation, and
$n$ is a positive integer, and $$F(-\omega^2, n, \Delta t) = \sum_{k=1}^{n} \frac{\Delta t^{2k}}{(2k)!} (-\omega^2)^k,$$

and wherein the predicted time dispersion error is $|\theta(\omega, \Delta t) \omega \Delta t|$.

In an embodiment of the present invention, the step of compensating the seismic wave data at the first region of the geological structure with the predicted time dispersion error is performed in a frequency domain.

In an embodiment of the present invention, the step of calculating the corrected predicted seismic wave data at the second region of the geological structure comprises: transforming the seismic wave data at the first region of the geological structure compensated with the predicted time dispersion error in the frequency domain into a time domain, such that the actual time dispersion error is negated by the predicted time dispersion error in the time domain.

In an embodiment of the present invention, the step of compensating the seismic wave data at the first region of the geological structure with the predicted time dispersion error comprises: phase shifting the seismic wave data at the first region of the geological structure with an amount corresponding to the predicted time dispersion error, before using the finite difference method to calculate the predicted seismic wave data at the second region of the geological structure.

In an embodiment of the present invention, the step of phase shifting the seismic wave data at the first region of the geological structure with an amount corresponding to the predicted time dispersion error is performed in a frequency domain.

Figure 7:
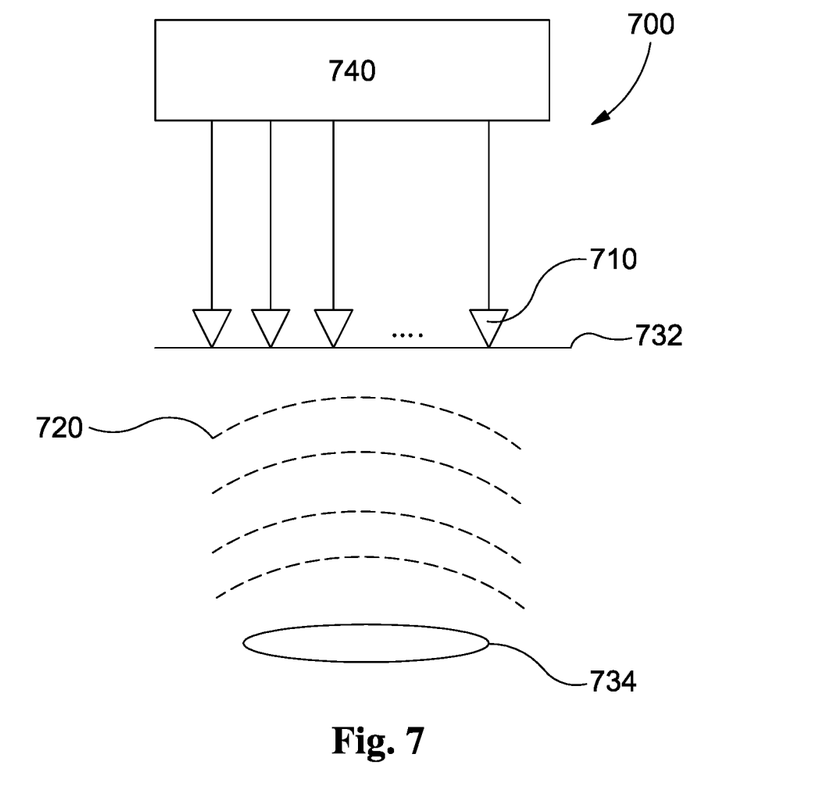
FIG. 7 shows a system for forming a seismic image of a geological structure in accordance with an embodiment of the present invention.

In addition, as shown in FIG. 7, in one embodiment, the present invention can be implemented in a system 700 for forming a seismic image of a geological structure, which comprises a plurality of seismic sensors 710 configured to collect seismic wave data 720 at a first region 732 of the geological structure, the seismic wave data 720 including a plurality of seismic wave traces; and a seismic imaging generating apparatus 740 configured to: receive the seismic wave data 720 at the first region 732 of the geological structure collected by the plurality of seismic sensors 710, calculate a predicted time dispersion error of an actual time dispersion error that results from a use of a finite difference approximation in calculating predicted seismic wave data at a second region 734 of the geological structure as if a seismic wave propagates from the first region 732 to the second region 734 of the geological structure, compensate each of the seismic wave traces of the seismic wave data at the first region of the geological structure with the predicted time dispersion error, before using the finite difference method to calculate the predicted seismic wave data at the second region of the geological structure, calculate a corrected predicted seismic wave data at the second region of the geological structure by applying the finite difference approximation to the seismic wave data at the first region of the geological structure compensated with the predicted time dispersion error, and generate a seismic image of the second region of the geological structure using the corrected predicted seismic wave data, such that the actual time dispersion error is negated by the predicted time dispersion error.

In an embodiment of the present invention, the seismic imaging generating apparatus 740 can be realized in digital electronic circuitry or hardware, including a programmable processor, a computer, a server, or multiple processors, computers or servers and their structural equivalents, or in combinations of one or more of them.

In another embodiment, the present invention can be implemented as one or more computer program products, i.e., one or more modules of computer program instructions encoded on a non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for forming a seismic image of a geological structure, the method comprising:
    obtaining seismic wave data at a first region of the geological structure, the seismic wave data including a plurality of seismic wave traces;
    calculating a predicted time dispersion error of an actual time dispersion error that results from a use of a finite difference approximation in calculating predicted seismic wave data at a second region of the geological structure as if a seismic wave propagates from the first region to the second region of the geological structure;
    compensating each of the seismic wave traces of the seismic wave data at the first region of the geological structure with the predicted time dispersion error, before using the finite difference method to calculate the predicted seismic wave data at the second region of the geological structure;
    calculating a corrected predicted seismic wave data at the second region of the geological structure by applying the finite difference approximation to the seismic wave data at the first region of the geological structure compensated with the predicted time dispersion error; and
    generating a seismic image of the second region of the geological structure using the corrected predicted seismic wave data, such that the actual time dispersion error is negated by the predicted time dispersion error.

2. The method of claim 1, wherein the step of calculating the predicted time dispersion error comprises:
    estimating a phase shift that results from the use of the finite difference approximation in calculating predicted seismic wave data at the second region of the geological structure,
    wherein the phase shift is $\theta(\omega, \Delta t) = \text{sgn}(\omega) \cdot a \cos(1 + F(-\omega^2, n, \Delta t))$, where
    $\omega$ is an angular frequency of the seismic wave trace,
    $\Delta t$ is a time step of the finite difference approximation,
    $2n$ is an order of the finite difference approximation, and
    $n$ is a positive integer, and $$F(-\omega^2, n, \Delta t) = \sum_{k=1}^{n} \frac{\Delta t^{2k}}{(2k)!}(-\omega^2)^k,$$

and wherein the predicted time dispersion error is $|\theta(\omega, \Delta t) - \omega \Delta t|$.

3. The method of claim 1, wherein the step of compensating the seismic wave data at the first region of the geological structure with the predicted time dispersion error is performed in a frequency domain.

4. The method of claim 3, wherein the step of calculating the corrected predicted seismic wave data at the second region of the geological structure comprises:
    transforming the seismic wave data at the first region of the geological structure compensated with the predicted time dispersion error in the frequency domain into a time domain, such that the actual time dispersion error is negated by the predicted time dispersion error in the time domain.

5. The method of claim 1, wherein the step of compensating the seismic wave data at the first region of the geological structure with the predicted time dispersion error comprises:
    phase shifting the seismic wave data at the first region of the geological structure with an amount corresponding to the predicted time dispersion error, before using the finite difference method to calculate the predicted seismic wave data at the second region of the geological structure.

6. The method of claim 5, wherein the step of phase shifting the seismic wave data at the first region of the geological structure with an amount corresponding to the predicted time dispersion error is performed in a frequency domain.

7. The method of claim 6, wherein the step of calculating the corrected predicted seismic wave data at the second region of the geological structure comprises:
    transforming the seismic wave data at the first region of the geological structure compensated with the predicted time dispersion error in the frequency domain into a time domain, such that the actual time dispersion error is negated by the predicted time dispersion error in the time domain.

8. The method of claim 1, wherein the step of calculating the corrected predicted seismic wave data at the second region of the geological structure comprises:
    transforming the seismic wave data at the first region of the geological structure compensated with the predicted time dispersion error in a frequency domain into a time domain, such that the actual time dispersion error is negated by the predicted time dispersion error in the time domain.

9. A system for forming a seismic image of a geological structure, comprising:
    a plurality of seismic sensors configured to collect seismic wave data at a first region of the geological structure, the seismic wave data including a plurality of seismic wave traces; and
    a seismic imaging generating apparatus configured to:
    receive the seismic wave data at the first region of the geological structure collected by the plurality of seismic sensors,
    calculate a predicted time dispersion error of an actual time dispersion error that results from a use of a finite difference approximation in calculating predicted seismic wave data at a second region of the geological structure as if a seismic wave propagates from the first region to the second region of the geological structure,
    compensate each of the seismic wave traces of the seismic wave data at the first region of the geological structure with the predicted time dispersion error, before using the finite difference method to calculate the predicted seismic wave data at the second region of the geological structure,
    calculate a corrected predicted seismic wave data at the second region of the geological structure by applying the finite difference approximation to the seismic wave data at the first region of the geological structure compensated with the predicted time dispersion error, and generate a seismic image of the second region of the geological structure using the corrected predicted seismic wave data, such that the actual time dispersion error is negated by the predicted time dispersion error.

10. The system of claim 9, wherein the seismic imaging generating apparatus is configured to calculate the predicted time dispersion error by estimating a phase shift that results from the use of the finite difference approximation in calculating predicted seismic wave data at the second region of the geological structure, wherein the phase shift is θ(ω, Δt)=sgn(ω)·a cos(1+F(−ω², n, Δt)), where ω is an angular frequency of the seismic wave trace, Δt is a time step of the finite difference approximation, 2n is an order of the finite difference approximation, and n is a positive integer, and $$F(-\omega^2, n, \Delta t) = \sum_{k=1}^{n} \frac{\Delta t^{2k}}{(2k)!}(-\omega^2)^k,$$

and wherein the predicted time dispersion error is |θ(ω, Δt)−ωΔt|.

11. The system of claim 9, wherein the seismic imaging generating apparatus is configured to compensate the seismic wave data at the first region of the geological structure with the predicted time dispersion error in a frequency domain.

12. The system of claim 11, wherein the seismic imaging generating apparatus is configured to calculate the corrected predicted seismic wave data at the second region of the geological structure by transforming the seismic wave data at the first region of the geological structure compensated with the predicted time dispersion error in the frequency domain into a time domain, such that the actual time dispersion error is negated by the predicted time dispersion error in the time domain.

13. The system of claim 9, wherein the seismic imaging generating apparatus is configured to compensate the seismic wave data at the first region of the geological structure with the predicted time dispersion error by phase shifting the seismic wave data at the first region of the geological structure with an amount corresponding to the predicted time dispersion error, before using the finite difference method to calculate the predicted seismic wave data at the second region of the geological structure.

14. The system of claim 13, wherein the seismic imaging generating apparatus is configured to phase shift the seismic wave data at the first region of the geological structure with an amount corresponding to the predicted time dispersion error in a frequency domain.

15. The system of claim 14, wherein the seismic imaging generating apparatus is configured to calculate the corrected predicted seismic wave data at the second region of the geological structure by transforming the seismic wave data at the first region of the geological structure compensated with the predicted time dispersion error in the frequency domain into a time domain, such that the actual time dispersion error is negated by the predicted time dispersion error in the time domain.

16. The system of claim 9, wherein the seismic imaging generating apparatus is configured to calculate the corrected predicted seismic wave data at the second region of the geological structure by transforming the seismic wave data at the first region of the geological structure compensated with the predicted time dispersion error in a frequency domain into a time domain, such that the actual time dispersion error is negated by the predicted time dispersion error in the time domain.

17. A non-transitory computer-readable medium containing computer executable instructions for performing a method for forming a seismic image of a geological structure, the computer executable instructions comprising:

obtaining seismic wave data at a first region of the geological structure, the seismic wave data including a plurality of seismic wave traces;

calculating a predicted time dispersion error of an actual time dispersion error that results from a use of a finite difference approximation in calculating predicted seismic wave data at a second region of the geological structure as if a seismic wave propagates from the first region to the second region of the geological structure;

compensating each of the seismic wave traces of the seismic wave data at the first region of the geological structure with the predicted time dispersion error, before using the finite difference method to calculate the predicted seismic wave data at the second region of the geological structure;

calculating a corrected predicted seismic wave data at the second region of the geological structure by applying the finite difference approximation to the seismic wave data at the first region of the geological structure compensated with the predicted time dispersion error; and generating a seismic image of the second region of the geological structure using the corrected predicted seismic wave data, such that the actual time dispersion error is negated by the predicted time dispersion error.

18. The non-transitory computer-readable medium of claim 17, wherein the computer executable instructions of calculating the predicted time dispersion error comprise:

estimating a phase shift that results from the use of the finite difference approximation in calculating predicted seismic wave data at the second region of the geological structure, wherein the phase shift is θ(ω, Δt)=sgn(ω)·a cos(1+F(−ωw², n, Δt)), where ω is an angular frequency of the seismic wave trace, Δt is a time step of the finite difference approximation, 2n is an order of the finite difference approximation, and n is a positive integer, and $$F(-\omega^2, n, \Delta t) = \sum_{k=1}^{n} \frac{\Delta t^{2k}}{(2k)!}(-\omega^2)^k,$$

and wherein the predicted time dispersion error is |θ(ω, Δt)−ωΔt|.

19. The non-transitory computer-readable medium of claim 17, wherein the computer executable instructions of compensating the seismic wave data at the first region of the geological structure with the predicted time dispersion error are performed in a frequency domain.

20. The non-transitory computer-readable medium of claim 19, wherein the computer executable instructions of calculating the corrected predicted seismic wave data at the second region of the geological structure comprise:

transforming the seismic wave data at the first region of the geological structure compensated with the predicted time dispersion error in the frequency domain into a time domain, such that the actual time dispersion error is negated by the predicted time dispersion error in the time domain.

21. The non-transitory computer-readable medium of claim 17, wherein the computer executable instructions of compensating the seismic wave data at the first region of the geological structure with the predicted time dispersion error comprise:

phase shifting the seismic wave data at the first region of the geological structure with an amount corresponding to the predicted time dispersion error, before using the finite difference method to calculate the predicted seismic wave data at the second region of the geological structure.

22. The non-transitory computer-readable medium of claim 21, wherein the computer executable instructions of phase shifting the seismic wave data at the first region of the geological structure with an amount corresponding to the predicted time dispersion error are performed in a frequency domain.

23. The non-transitory computer-readable medium of claim 22, wherein the computer executable instructions of calculating the corrected predicted seismic wave data at the second region of the geological structure comprise:

transforming the seismic wave data at the first region of the geological structure compensated with the predicted time dispersion error in the frequency domain into a time domain, such that the actual time dispersion error is negated by the predicted time dispersion error in the time domain.

24. The non-transitory computer-readable medium of claim 17, wherein the computer executable instructions of calculating the corrected predicted seismic wave data at the second region of the geological structure comprise:

transforming the seismic wave data at the first region of the geological structure compensated with the predicted time dispersion error in a frequency domain into a time domain, such that the actual time dispersion error is negated by the predicted time dispersion error in the time domain.

\* \* \* \* \*